May 10, 1938. W. M. ZAROTSCHENZEFF 2,116,738
METHOD AND APPARATUS FOR FREEZING VEGETABLES AND FRUITS
Original Filed May 31, 1934 2 Sheets-Sheet 1
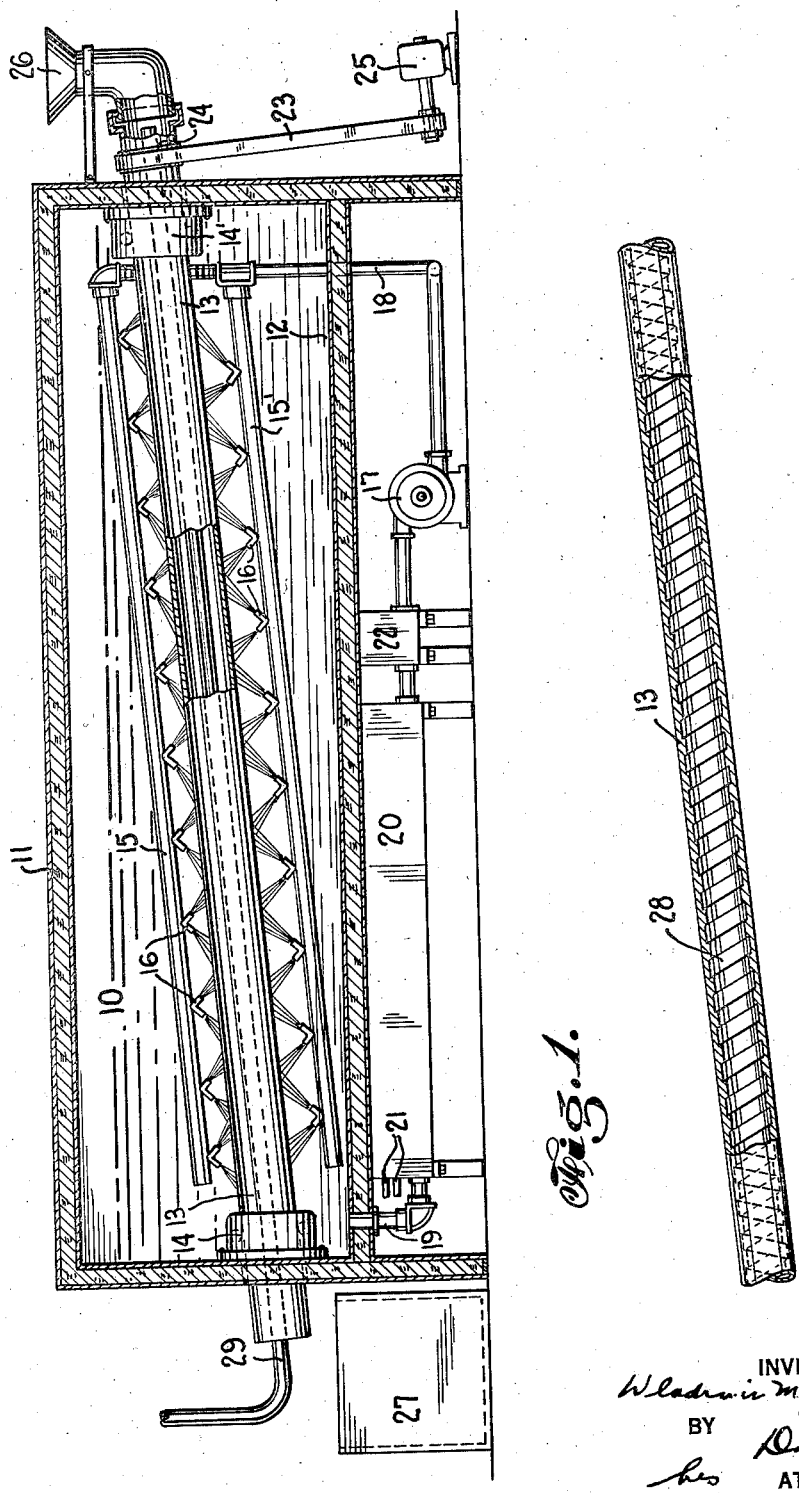

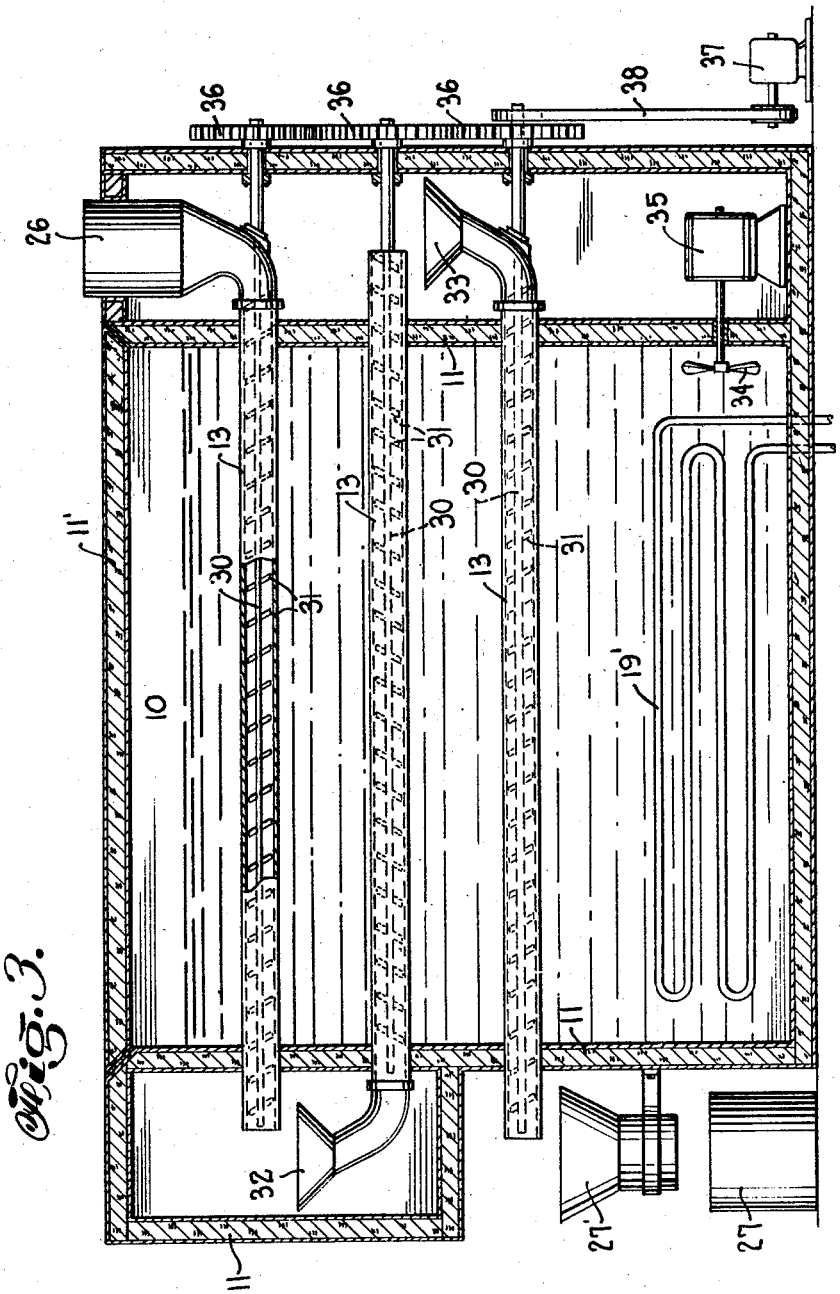

Patented May 10, 1938

2,116,738

UNITED STATES PATENT OFFICE 2,116,738

METHOD AND APPARATUS FOR FREEZING VEGETABLES AND FRUITS

Wladimir M. Zarotschenzeff, Englewood, N. J., assignor, to Z Pack Corporation, a corporation of Delaware Application May 31, 1934, Serial No. 728,331
Renewed March 4, 1937

15 Claims. (Cl. 62—104)

This invention relates to improvements in methods of and apparatus for freezing vegetables and fruits, and other products, being particularly applicable for green peas, berries, cut corn, beans, and like small fruits and vegetables.

Broadly, it is an object of this invention to provide a method of and apparatus for freezing green peas, berries and the like in a continuous process wherein such fruits and vegetables may be quickly frozen.

Further, it is an object of this invention to provide for a method of quick freezing fruits and vegetables, wherein the same are frozen substantially through the medium of conduction and convection.

Specifically, it is an object of this invention to provide for an apparatus for carrying out a method of quick freezing, involving the use of a continuous process incorporating a refrigerating conduit, substantially in the form of a tunnel, through which the fruits and vegetables pass progressively, the products being refrigerated during their movement through the conduit by contact with the walls of the conduit and by convection within the conduit.

Still further, it is an object of this invention for the apparatus to carry out a continuous method of quick freezing fruits and vegetables, and other products, wherein, the products in their progressive movement therethrough are caused to be rotated about their own axes while being subjected to refrigeration by conduction and convection.

The method and apparatus proposed herein are substantially different from the present or old methods in use for freezing such products. For instance, under already known methods, green peas, after they are prepared for freezing, are blanched and chilled, then put into various kinds of containers, and which thereafter are placed in cold storage rooms held at a freezing temperature. By these means the product in containers is frozen rather slowly.

This usual or conventional method of freezing has many drawbacks. The average size of the container in which the product is packed is large, 5 lbs., and more, so that the package takes considerable time to freeze through. It is now an established scientific as well as practical fact that perishable food products best retain their original freshness and structure if they are frozen very rapidly.

There are at present various schemes for freezing products in containers by placing them in chambers held at a very low temperature. In order to hasten the rate of freezing, air is forced around such container at a considerable velocity. But even when using such expensive methods and very low temperature it usually takes many hours to freeze the bulky package through to the center.

Another disadvantage in freezing such products as green peas, berries, beans and the like, in a container, is found in the fact that the product deteriorates very rapidly so that it sometimes occurs that the product becomes sour at the center, before it actually is frozen.

Still another disadvantage attributable to the old method lies in the fact that the individual pieces of product freeze together into a lump, so that when such package is opened later on it is very difficult to separate the product or to take only a portion of the contents without using considerable force and actually damaging the product.

It is also a well known fact in the refrigerating technic that the freezing speed depends very largely on the size of the product, so that a small product will freeze much more rapidly than a bulky one. In other words, it is much easier and faster to freeze a product of a small size rather than a bulky and large container.

This invention avoids all of the above enumerated disadvantages and permits a very quick freezing in a simple and efficient manner.

These and other advantages, capabilities and features of the invention will appear from the subjoined detailed description of one specific embodiment thereof illustrated in the accompanying drawings, in which Figure 1 is a front elevation partially in section showing the construction of the device.

Figure 2 is a front elevation partly in section showing a modified form of the refrigerating conduit.

Figure 3 is a front elevation partly in section showing a further modification of the refrigerating conduit.

Referring to the reference characters in the drawings, numeral 10 represents a refrigerating chamber, the walls 11 of which are formed of waterproofed insulation and the interior of which is so formed that refrigerating liquid which has been applied may be collected within the tank 12 at the base of the chamber.

Within the chamber and extending from one end to the other are one or more refrigerating conduits or tunnels 13, tubular in formation and of a length from 30 to 70 feet, which tubular conduit is supported for rotation in bearings 14 and 14' disposed at the opposite end walls of the chamber. Above and below the tubular conduit or tunnel are disposed spray coils 15 and 15' having disposed thereon a series of spray nozzles 16 respectively directed downwardly and upwardly, each nozzle having one or more outlets, so that a refrigerated brine or the like at the necessary low temperature may be delivered by pump 17 through feed pipe 18 into the respective spray coils 15 and 15' for discharge through spray nozzles 16 on the exterior surface of the tubular conduit or tunnel 13, and within the chamber 10. The details of construction of the apparatus for bringing the refrigerant to the requisite temperature has been omitted, any well known source of primary refrigeration therefor being applicable in this apparatus.

The spray refrigerant after extracting heat from the chamber and from the tubular conduit 13 falls into the shallow tank 12 at the base of the chamber and from there is discharged through pipe 19 into the refrigerating tank 20 where a second refrigerant passed through pipes 21 and of the nature of liquid $CO_2$, liquid ammonia or the like, will bring the spray refrigerant down to the necessary freezing temperature; from whence the spray refrigerant is passed through filter 22 and then delivered as heretofore described into the chamber for use by the pump 17. The tubular refrigerating conduit or tunnel 13 is driven by belt 23 acting on pulley 24 fixed thereto, the belt drive being in this instance a motor 25.

The tubular conduit or tunnel 13, as shown, is inclined downwardly at a slight angle, so that the vegetables or fruits delivered therein through hopper 26 may be caused to be displaced downwardly towards the receiving container 27 by gravity, while at the same time through the slow rotation of the tubular conduit or tunnel 13 the fruits and vegetables are constantly rotated about the axis of the conduit and about their own axes, so that in their progressive displacement, the fruits and vegetables are caused to make surface contact with the inner periphery of the conduit, thereby providing freezing by conduction.

As shown in Figure 1, an additional refrigerating medium may be applied within the tubular refrigerating conduit or tunnel in the nature of a pipe 29 through which refrigerated brine or any other refrigerant may be applied. Although no specific connection is shown leading from the opposite ends of refrigeration pipe 29, it is to be understood that the same is connected in a pipe system supplying refrigerant which may be independent of the pipe system 15, 18, or may be connected thereto in any well-known manner in order to provide a continuous circulation of refrigerant through pipe 29.

In the modification shown in Figure 2, another form of refrigerating conduit is shown, wherein the interior is shaped to provide a continuous spiral cavity or channel 28, thereby introducing a positive direction of the vegetables and fruits in the channels during their progressive movement, in order that each and every surface portion of the fruits and vegetables may in its rotative and gravitative movement be contacted with a portion of the cold metal interior of the refrigerating conduit to receive conductive refrigeration, at the same time that the product is subjected to the refrigerating atmosphere within the tubular conduit, to receive convective refrigeration.

In the modification shown in Figure 3, another form of a refrigerating apparatus is shown wherein it is provided that the conduit or conduits are fixed and positioned horizontally or at a slight angle.

In Figure 3, there is a chamber 10, with insulated walls 11, which are water-tight. The chamber or a large tank is covered by a removable and insulated top 11'. In the lower part of tank 10, there are refrigerating coils 19', through which primary refrigerant passes causing the refrigeration of the liquid with which the tank is filled as indicated by the level of the liquid in Figure 3.

Through the length of the tank are built-in cylinder-like or tubular conduits 13 which are sealed properly so as not to let the liquid from the tank escape. At opposite ends these tubular conduits extend sufficiently to permit loading and unloading of the product which is handled through them. Within the conduits are shafts or rods 30 carrying a series of spaced paddles 31, assembled in spiral formation and to which a slight tilt is given so that, when rotating on the shaft or rod 30 they propel the product within the conduit.

The product is fed through the upper hopper 26 and passes gradually through the entire length of the upper conduit, then on reaching the end, the product, already partially frozen, drops into another funnel 32, which conveys the product to a second, lower conduit.

The product moves here in the reverse direction until it reaches the end and drops into funnel 33 from which it passes into the last conduit wherein freezing is finished. It is within the scope of this invention to use any plurality and any combination of such conduits, whether superimposed or working in parallel batteries. The frozen product drops into hopper 27' and from there is deposited into a container 27, and is ready to be put into cold storage.

In order to facilitate the heat transfer the nonfrozen liquid in the tank, such as sodium and calcium chloride or the like, is circulated by means of a propeller 34, operated by the motor 35. The movement of the shafts or rods with paddles is brought about through the means of interlocking gears 36, of which the last one is operated by the motor 37 through the chain or belt pulley 38.

It will be noticed that the protruding opposite ends of the conduits are within insulated enclosures through which there is only a minimum loss of refrigeration, as there are only two actual openings, one through the funnel 26, and the other at the outlet end of the lower conduit.

While in this modification the refrigeration of the conduits has been accomplished by cold liquid in circulation, it is also possible to use sprays similar to those described in Figure 1, or employing any well known means for supplying refrigeration, such as cold air, dry ice, etc.

Although the illustrations disclosed and described herein indicate specific forms and assembly of conduits or tunnels in order to carry out the refrigeration as desired, it is within the province of this invention to vary the shape, length and size of the same, also to provide multiple groups of conduits. Further, it is within the province of this invention to provide for various means for displacing the fruits and vegetables to bring about their progressive movement within the conduit for freezing, so long as such fruits and vegetables are subjected to freezing by conduction and convection or both, in the manner indicated.

It is obvious that various changes and modifications may be made to the details of construction without departing from the general spirit of the invention as set forth in the appended claims:

I claim:

1. A method of freezing vegetables and fruits comprising causing the same to be rotated about an axis and about their own axes while passing through a chamber and subjecting the same to freezing by conduction and convection from refrigerating sources acting exteriorly and interiorly of said chamber.

2. A method of refrigerating vegetables and fruits, comprising passing the same progressively through a refrigerating chamber, causing the same to be rotated while in motion about a common axis and about their own axes, and applying refrigerating media peripherally and axially of said chamber, for subjecting the vegetables and fruits to freezing during their progressive movement by conduction and convection.

3. In an apparatus for refrigerating vegetables and the like, a chamber, a refrigerating conduit in said chamber, means exteriorly and interiorly of said conduit for maintaining respectively the surfaces and the interior of the conduit at low temperatures, said conduit being disposed at an incline within the chamber and means for rotating said conduit, whereby fruits and vegetables fed into the conduit in their progressive movement by gravity towards the outlet of the conduit are subjected to refrigeration by conduction and convection.

4. In an apparatus for refrigerating fruits and vegetables, a chamber, a conduit disposed at an incline in said chamber, means for rotating said conduit, means applied respectively externally and internally of said conduit for maintaining the conduit at low temperatures, whereby fruits and vegetables fed into the conduit may be caused to be rotated by the actuation of said conduit in conjunction with the gravitational movement of the fruits and vegetables, thereby to impart a spiral path to the fruits and vegetables being refrigerated as they pass progressively through the conduit.

5. In an apparatus for refrigerating fruits and vegetables, a chamber, a conduit disposed at an incline in said chamber, means for rotating said conduit, means applied respectively externally and internally of said conduit for maintaining the conduit at low temperatures, whereby fruits and vegetables fed into the conduit may be caused to be rotated by the actuation of said conduit in conjunction with the gravitational movement of the fruits and vegetables, thereby to impart a spiral path to the fruits and vegetables being refrigerated as they pass progressively through the conduit, said fruits and vegetables being refrigerated by conduction through contact with the surfaces of the conduit, by convection from the cold atmosphere in the conduit.

6. In an apparatus for refrigerating fruits and vegetables, a chamber, a conduit disposed at an incline in said chamber, means for rotating said conduit, means applied respectively externally and internally of said conduit for maintaining the conduit at low temperatures, whereby fruits and vegetables fed into the conduit may be caused to be rotated by the actuation of said conduit in conjunction with the gravitational movement of the fruits and vegetables, thereby to impart a spiral path to the fruits and vegetables being refrigerated as they pass progressively through the conduit, said fruits and vegetables being refrigerated by conduction through contact with the surfaces of the conduit, by convection from the cold atmosphere in the conduit, said fruits and vegetables in their movement through the conduit being displaced about the axis of the conduit and about their own axes.

7. A method of treating vegetables and fruits, comprising passing the same through a tunnel having a refrigerating conduit therein and having heat conductive walls, and subjecting the vegetables and fruits to refrigeration by conduction and convection through the application of refrigerating media acting respectively on the walls of the tunnel and on the walls of the conduit.

8. A method of refrigerating vegetables and fruits, comprising passing the same progressively through a tunnel and subjecting the same to refrigeration by conduction and convection from refrigerating media acting exteriorly and interiorly of said tunnel.

9. In an apparatus for refrigerating vegetables and the like, a chamber having heat conductive walls, a conduit in said chamber, a refrigerating medium passing through said conduit and a refrigerating medium applied to the wall of said chamber, whereby products disposed in said chamber are subjected to refrigeration from sources without and within the chamber.

10. Refrigerating apparatus comprising a movable supporting and enclosing surface, said surface being adapted to advance products therethrough upon movement of the surface, means to move the surface to cause products to be moved with respect to the surface and advance therethrough, and means to apply a refrigerating medium exteriorly of the enclosing surface to remove heat from the products to effect the freezing thereof.

11. Refrigerating apparatus comprising a movable supporting surface and means to move the surface to cause products to be moved with respect to the surface and means to apply a refrigerant in spray form to the surface to remove heat from the products to effect the freezing thereof.

12. Refrigerating apparatus comprising a movable supporting surface forming an enclosure, means to move the surface to cause products to be moved with respect to the surface and within the enclosure, and means to apply a refrigerant in spray form to the surface exteriorly of the enclosure to remove heat from the products to effect the freezing thereof.

13. Refrigerating apparatus comprising a movable heat conductive member for receiving and supporting a plurality of food products on one surface thereof, means for moving the surface to advance the food products and bring different portions of the surfaces of the food products into contact with the said one surface and means for applying a refrigerating medium to another surface of the member to remove heat from the products and effect freezing thereof.

14. Refrigerating apparatus comprising a movable enclosed heat-conductive surface sloping with respect to the horizontal for receiving and supporting food products, means for moving the surface to cause the products to move along the surface by gravity and means for applying a refrigerating medium to the exterior of the enclosure to effect freezing of the products.

15. Refrigerating apparatus comprising an enclosed heat conductive surface for receiving and supporting food products, means for moving the surface to advance the food products relatively to the surface, means for applying a refrigerating medium to the outside of the enclosed surface to effect freezing of the products and means for removing heat from the interior of the enclosure.

WLADIMIR M. ZAROTSCHENZEFF.